United States Patent
Bahri (10) Patent No.: US 12,005,779 B2
(45) Date of Patent: Jun. 11, 2024

(54) ROTARY DEVICE WITH CLUTCH WITH TIME-BASED SLIP AND METHOD OF PROVIDING TIME-BASED SLIP FOR A ROTARY DEVICE

(71) Applicant: Litens Automotive Partnership, Woodbridge (CA)

(72) Inventor: Ashaad Bahri, Toronto (CA)

(73) Assignee: LITENS AUTOMOTIVE PARTNERSHIP, Woodbridge, CA (US)

( * ) Notice: Subject to any disclaimer, the term of this patent is extended or adjusted under 35 U.S.C. 154(b) by 398 days.

(21) Appl. No.: 17/593,289

(22) PCT Filed: Mar. 26, 2020

(86) PCT No.: PCT/CA2020/050398
§ 371 (c)(1),
(2) Date: Sep. 15, 2021

(87) PCT Pub. No.: WO2020/191495
PCT Pub. Date: Oct. 1, 2020

(65) Prior Publication Data
US 2022/0194225 A1  Jun. 23, 2022

Related U.S. Application Data
(60) Provisional application No. 62/930,255, filed on Nov. 4, 2019, provisional application No. 62/823,662, filed on Mar. 26, 2019.

(51) Int. Cl.
*F16D 3/14* (2006.01)
*B60K 25/02* (2006.01)
(Continued)

(52) U.S. Cl.
CPC .............. *B60K 25/02* (2013.01); *F02B 67/06* (2013.01); *F16D 3/14* (2013.01); *F16D 7/021* (2013.01);
(Continued)

(58) Field of Classification Search
CPC ... F16D 3/14; F16D 7/02; F16D 7/021; F16D 7/022; F16D 43/211; F16D 41/206;
(Continued)

(56) References Cited

U.S. PATENT DOCUMENTS 2,559,400 A   7/1951  Hoy
2,761,547 A   9/1956  Gehrer
(Continued)

FOREIGN PATENT DOCUMENTS

CN   1777765 A    5/2006
CN   1856664 A    11/2006
(Continued)

OTHER PUBLICATIONS

International Search Report and Written Opnion for PCT/CA2020/050398 dated May 29, 2020, Canadian Intellectual Property Office.
(Continued)

*Primary Examiner* — Tinh Dang
(74) *Attorney, Agent, or Firm* — Aird & McBurney LP (57) ABSTRACT

In one aspect, there is provided a decoupler for an accessory drive for an engine. The decoupler includes a decoupler input member and a decoupler output member. One of the decoupler input member and the decoupler output member has a clutch engagement surface. The decoupler further includes a wrap spring clutch and an isolation spring that act in series in a torque path between the decoupler input member and the decoupler output member. The wrap spring clutch has a radially inner surface and a radially outer surface. One of the radially inner and outer surfaces engages (Continued)

the clutch engagement surface in an interference fit with the clutch engagement surface. The decoupler further includes a volume of lubricant. During sufficiently high acceleration of the decoupler input member, there is slippage at the wrap spring clutch for a selected period of time after which the slippage stops.

11 Claims, 8 Drawing Sheets

(51) Int. Cl.
    *F02B 67/06*     (2006.01)
    *F16D 7/02*      (2006.01)
    *F16D 13/12*     (2006.01)
    *F16D 43/21*     (2006.01)
    *F16H 7/20*      (2006.01)

(52) U.S. Cl.
    CPC .............. *F16D 7/022* (2013.01); *F16H 7/20* (2013.01); *B60K 2025/022* (2013.01)

(58) Field of Classification Search
    CPC .......... F16D 13/12; F16H 7/20; F16H 7/1218; F16H 25/02; B60K 2025/022
    See application file for complete search history.

(56) References Cited

U.S. PATENT DOCUMENTS

| | | |
|---|---|---|
| 2,899,193 A | 8/1959 | Foster |
| 3,047,280 A | 7/1962 | Pernetta |
| 3,602,205 A | 8/1971 | Turkish |
| 3,618,730 A | 11/1971 | Mould |
| 4,743,178 A | 5/1988 | Sheng |
| 4,750,087 A | 6/1988 | Carpenter et al. |
| 4,750,871 A | 6/1988 | Curwen |
| 5,139,463 A | 8/1992 | Bytzek et al. |
| 5,682,132 A | 10/1997 | Hiroyoshi et al. |
| 5,702,314 A | 12/1997 | Schmid |
| 5,749,449 A | 5/1998 | Kearney et al. |
| 6,044,943 A | 4/2000 | Bytzek et al. |
| 6,047,811 A | 4/2000 | Zittel et al. |
| 6,083,130 A | 7/2000 | Mevissen et al. |
| 6,161,512 A | 12/2000 | Beels van Heemstede |
| 6,394,248 B1 | 5/2002 | Monahan et al. |
| 6,659,248 B2 | 12/2003 | Terada |
| 6,710,489 B1 | 3/2004 | Gabrys |
| 7,070,033 B2 | 7/2006 | Jansen et al. |
| 7,153,227 B2 | 12/2006 | Dell et al. |
| 7,191,880 B2 | 3/2007 | Liston et al. |
| 7,207,910 B2 | 4/2007 | Dell et al. |
| 7,318,776 B2 | 1/2008 | Honda |
| 7,708,661 B2 | 5/2010 | Pflug et al. |
| 7,985,150 B2 | 7/2011 | Kamdem |
| 7,998,008 B2 | 8/2011 | Kamdem |
| 8,132,657 B2 | 3/2012 | Antchak et al. |
| 8,888,619 B2 | 11/2014 | Antchak et al. |
| 9,033,832 B1 * | 5/2015 | Serkh .................... F16D 41/206 474/70 |
| 9,689,486 B2 | 6/2017 | Williams |
| 2005/0250607 A1 | 11/2005 | Jansen et al. |
| 2006/0144664 A1 | 7/2006 | Antchak et al. |
| 2007/0066426 A1 | 3/2007 | Kamdem et al. |
| 2007/0123380 A1 | 5/2007 | Ishida et al. |
| 2007/0240964 A1 | 10/2007 | Saito et al. |
| 2008/0108442 A1 | 5/2008 | Jansen et al. |
| 2008/0139351 A1 | 6/2008 | Pflug et al. |
| 2008/0194339 A1 | 8/2008 | Antchak et al. |
| 2009/0176583 A1 | 7/2009 | Dell et al. |
| 2009/0176608 A1 | 7/2009 | Jansen et al. |
| 2010/0230227 A1 * | 9/2010 | Parsons ................. F16D 27/105 192/65 |
| 2013/0092501 A1 | 4/2013 | Schneider et al. |
| 2015/0285366 A1 * | 10/2015 | Serkh .................... F16D 41/203 474/94 |
| 2017/0122425 A1 * | 5/2017 | Schneider ............... F16H 55/36 |
| 2019/0063507 A1 * | 2/2019 | Serkh ..................... F16D 7/022 |

FOREIGN PATENT DOCUMENTS

| | | |
|---|---|---|
| CN | 1890479 A | 1/2007 |
| CN | 101111692 A | 1/2008 |
| CN | 101208534 A | 6/2008 |
| EP | 1772644 B1 | 11/2007 |
| JP | 10-509497 A | 9/1998 |
| JP | 2001523325 A | 11/2001 |
| JP | 2003278790 A | 10/2003 |
| JP | 2005-321045 A | 11/2005 |
| JP | 4549098 B2 | 9/2010 |
| WO | 1996012122 A1 | 4/1996 |
| WO | 2004011818 A1 | 2/2004 |
| WO | 2005057037 A1 | 6/2005 |
| WO | 2006081657 A1 | 8/2006 |
| WO | 2007003052 A1 | 1/2007 |
| WO | 2010048732 A1 | 5/2010 |
| WO | WO-2015024101 A1 * | 2/2015 ............. B60K 25/02 |

OTHER PUBLICATIONS

Basic Design of Spring Clutches, Reliability and Serviceability Engineering IBM Systems Development Div. Rochester, Minn., May 15, 1965.
Model SC Clutch Descriptions, Dynacorp.
Reell Electric Wrap Spring Clutches for advanced motion control systems, Webpage <https://reell.com/clutch_catalog.htm>, retrieved Aug. 9, 2007.
Extended European Search Report for EP09822958.6 dated Mar. 13, 2018, European Patent Office.
Office Action for CN201410829051.5 dated Oct. 9, 2016, State Intellectual Property Office.
Office Action for CN201410829051.5 dated Oct. 9, 2016, English translation.
Office Action with Search Report for KR10-2011-7009497, English translation, dated Nov. 13, 2015, Korean Intellectual Property Office.
Office Action with Search Report for KR10-2011-7009497, English translation, dated Aug. 5, 2016.
Office Action for CA2740322, dated Sep. 13, 2016, Canadian Intellectual Property Office.
Office Action for JP2011532473 (JPO) dated Dec. 4, 2013.
International Preliminary Report on Patentability for PCT/CA2009/001803 (ISA), dated May 12, 2011, Canadian Intellectual Property Office.
Notification of Reexamination for CN200980142270 (SIPO), dated Oct. 9, 2015.
Final Rejection of CN200980142270 (SIPO), dated Sep. 4, 2014.
Fourth Office Action for CN200980142270 (SIPO), dated Feb. 18, 2014.
Third Office Action for CN200980142270 (SIPO), dated Aug. 28, 2013.
Second Office Action for CN200980142270 (SIPO), dated Mar. 26, 2013.
Supplement Search Report and Notification of Grant for CN201410829051.5 , (SIPO) dated Jun. 2, 2017.
Extended European Search Report, EP 20777522.2 (EPO), dated Nov. 18, 2022.
English translation of CN101111692A.
English translation of CN101208534.
English translation of JP2003278790.
English translation of CN1856664A.
English translation of CN1890479A.
English translation of JP2005321045A.
English translation of JPH10509497A.
Mitchell, U.S. Pat. No. 475,087 dated May 17, 1892.
English translation of CN1777765A.
English translation of JP2001523325A.

(56) References Cited

OTHER PUBLICATIONS

English Translation of JP4549098B2.
Office Action for CN 202080016765.8 mailed Jan. 19, 2024 and English translation.

* cited by examiner

ROTARY DEVICE WITH CLUTCH WITH TIME-BASED SLIP AND METHOD OF PROVIDING TIME-BASED SLIP FOR A ROTARY DEVICE

CROSS-REFERENCE TO RELATED APPLICATIONS

This application is a national phase entry of PCT/CA2020/050398 filed Mar. 26, 2020, which claims the benefit of U.S. provisional application No. 62/823,662, filed Mar. 26, 2019, and U.S. provisional application No. 62/930,255, filed Nov. 4, 2019, the contents of both of which are incorporated herein by reference in their entirety.

FIELD

The specification relates generally to rotary devices with clutches that are mounted on accessory drives for engines. In particular, the specification relates to decouplers on accessory drives for vehicular engines.

BACKGROUND OF THE DISCLOSURE

During operation of a vehicle engine, it occurs sometimes that the crankshaft applies high torque to the accessory drive belt, which in turn applies this torque to the shafts of the accessories driven thereby. During some events the torque is very high, but relatively short-lived. It would be advantageous to provide a decoupling device for use on the accessory drive system that prevents such high torque inputs from reaching the accessories.

SUMMARY OF THE DISCLOSURE

In one aspect, there is provided a decoupler for an accessory drive for an engine. The decoupler includes a decoupler input member and a decoupler output member. One of the decoupler input member and the decoupler output member has a clutch engagement surface. The decoupler further includes a wrap spring clutch and an isolation spring that act in series in a torque path between the decoupler input member and the decoupler output member. The wherein the wrap spring clutch has a radially inner surface and a radially outer surface. One of the radially inner and outer surfaces engages the clutch engagement surface in an interference fit with the clutch engagement surface. The decoupler further includes a volume of lubricant that, in a first state of the decoupler, is positioned between said one of the radially inner and outer surfaces and the clutch engagement surface to lubricate the wrap spring clutch and the clutch engagement surface. The amount of interference and the lubricant are selected such that, when the decoupler is in the first state and the decoupler input member is accelerated at an acceleration that is beyond a threshold acceleration, the volume of lubricant generates slippage between said one of the radially inner and outer surfaces and the clutch engagement surface for a selected period of time. After the selected period of time, said one of the radially inner and outer surfaces engages the clutch engagement surface without slippage. The decoupler is in the first state when the engine is off. When the engine is turned on, the decoupler input member is accelerated at a startup acceleration that is beyond the threshold acceleration, but for a period of time that is less than the selected period of time, such that there is slippage throughout when the decoupler input member is accelerated at the startup acceleration.

In another aspect, a method is provided for controlling torque to an accessory in an accessory drive on an engine, comprising:

a) providing a decoupler including a decoupler input member and a decoupler output member, wherein one of the decoupler input member and the decoupler output member has a clutch engagement surface, and further including a wrap spring clutch and an isolation spring that act in series in a torque path between the decoupler input member and the decoupler output member, wherein the wrap spring clutch has a radially inner surface and a radially outer surface, wherein one of the radially inner and outer surfaces engages the clutch engagement surface, and further including a volume of lubricant that, in a first state of the decoupler, is positioned between said one of the radially inner and outer surfaces and the clutch engagement surface to lubricate the wrap spring clutch and the clutch engagement surface;

b) while the decoupler is in the first state and the engine is on, accelerating the decoupler input member at an acceleration that is beyond a threshold acceleration, during which the volume of lubricant generates slippage between said one of the radially inner and outer surfaces and the clutch engagement surface for a selected period of time, and then during continued acceleration beyond the threshold acceleration after the first period of time, said one of the radially inner and outer surfaces engages the clutch engagement surface without slippage; and c) while the decoupler is in the first state and the engine is off, turning the engine on and accelerating the decoupler input member at a startup acceleration that is beyond the threshold acceleration, but for a period of time that is less than the selected period of time, such that there is slippage throughout when the decoupler input member is accelerated at the startup acceleration.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings in which.

Unless otherwise specifically noted, articles depicted in the drawings are not necessarily drawn to scale.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Figure 1:
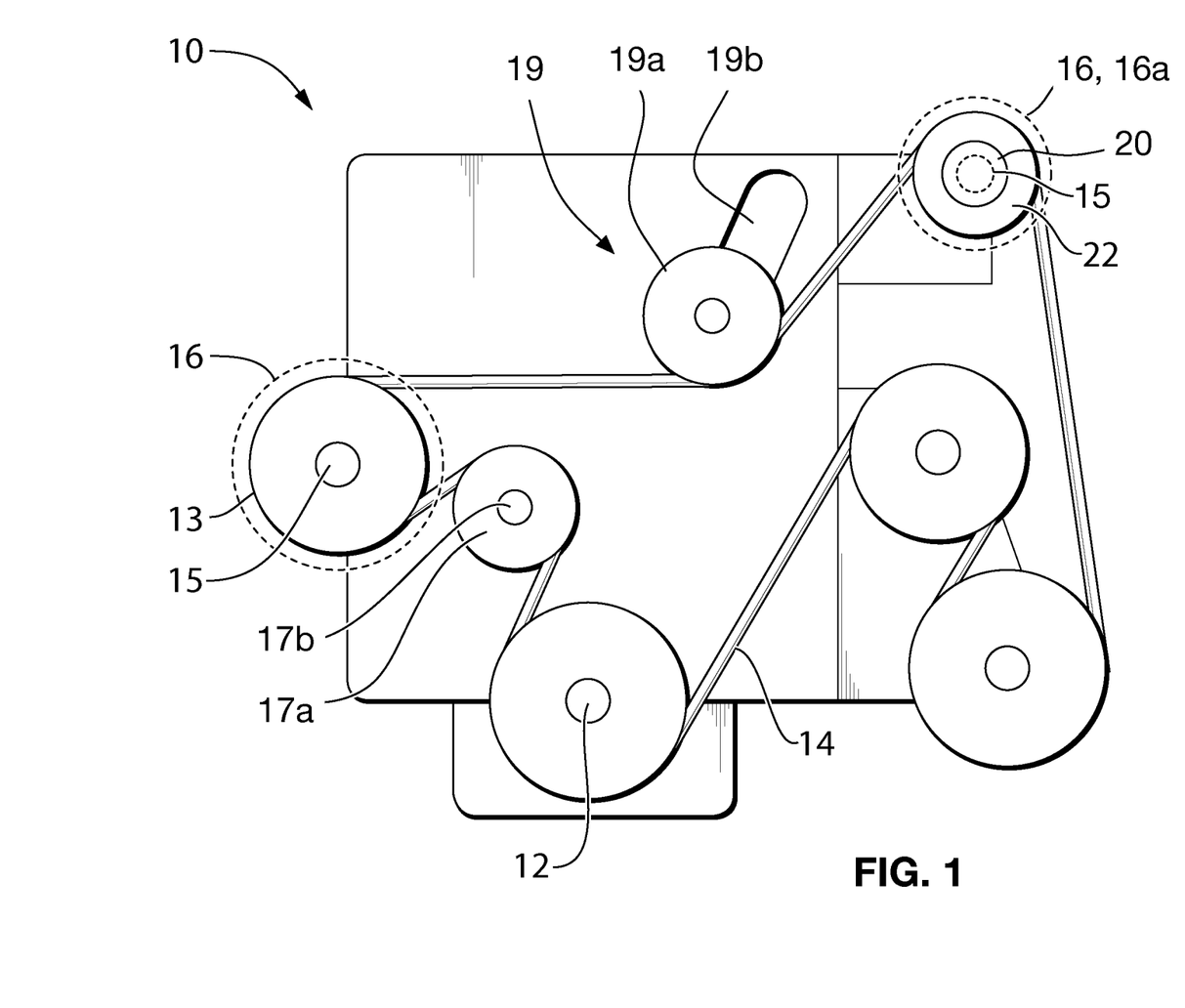
FIG. 1 is an elevation view of an engine with a decoupler in accordance with an embodiment of the present disclosure.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator and an air conditioning compressor. Each accessory 16 includes an accessory shaft 15 with a pulley 13 thereon, which is driven by the belt 14. Additionally, shown in the present embodiment is an idler pulley shown at 17a on an idler shaft 17b, and a tensioner pulley 19a rotatably mounted on a tensioner arm 19b, which form part of a tensioner 19. The functions of the idler pulley 17a and the tensioner 19 are well known to one of skill in the art.

A decoupler 20 may be provided instead of a pulley, between the belt 14 and the accessory shaft 15 of any one or more of the belt driven accessories 16. In FIG. 1, there is a decoupler 20 provided on the accessory shaft 15 of the alternator (shown at 16a). The decoupler 20 transfers torque between the belt 14 and the accessory shaft 15 but automatically decouples the accessory shaft 15 from the belt 14 when the belt 14 decelerates relative to the accessory shaft 15. Additionally, the decoupler 20 allows the speed of the belt 14 to oscillate relative to the accessory shaft 15. Oscillations in the speed of the belt 14 are the result of oscillations in the speed of the crankshaft 12, which is inherent to internal combustion piston engines. These oscillations are isolated from the accessory shaft 15 by the decoupler 20, and as a result, the stresses that would otherwise be incurred by the accessory shaft 15 and the accessory 16 are reduced.

Figure 2:
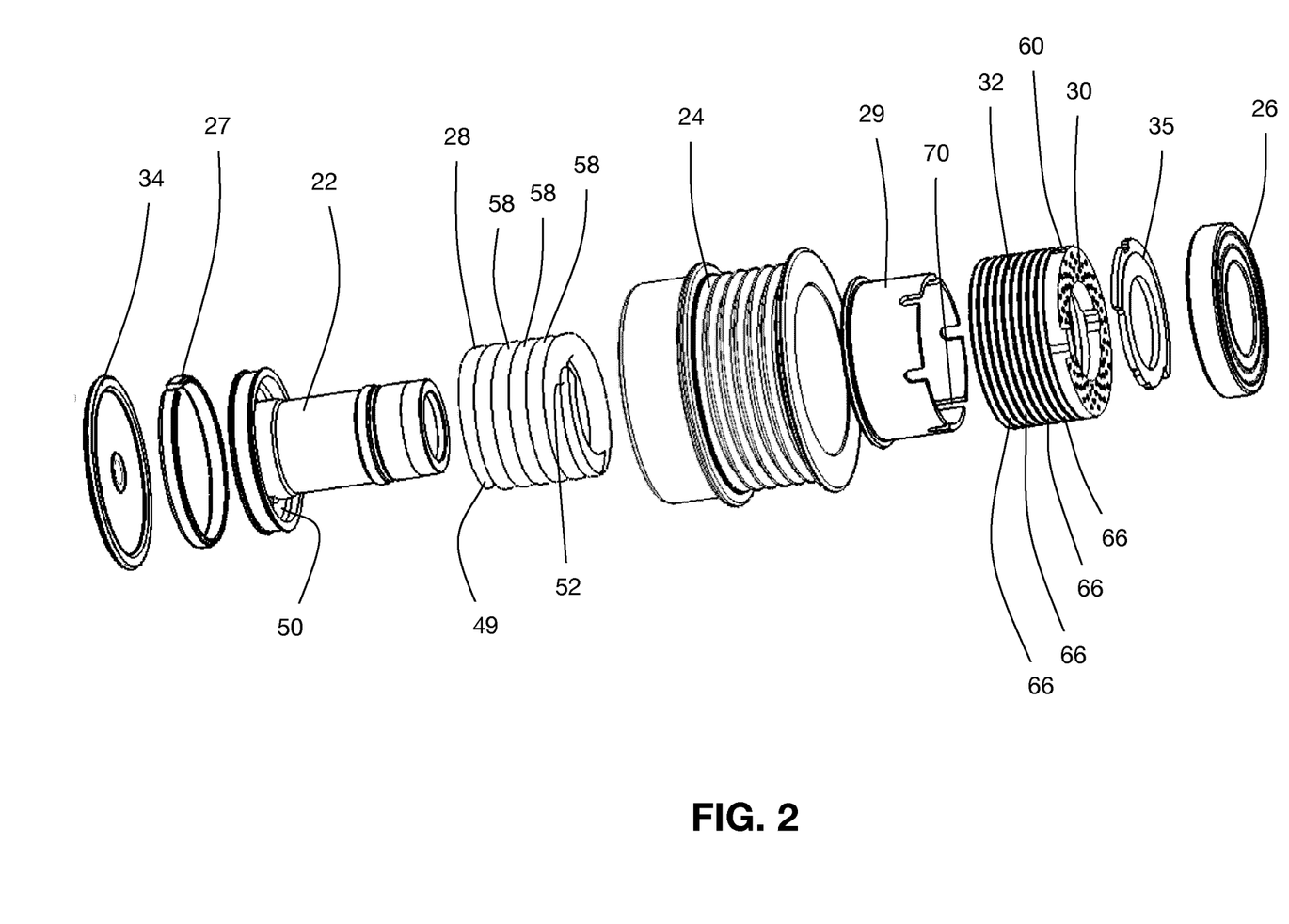
FIG. 2 is a perspective exploded view of the decoupler shown in FIG. 1.
Figure 3:
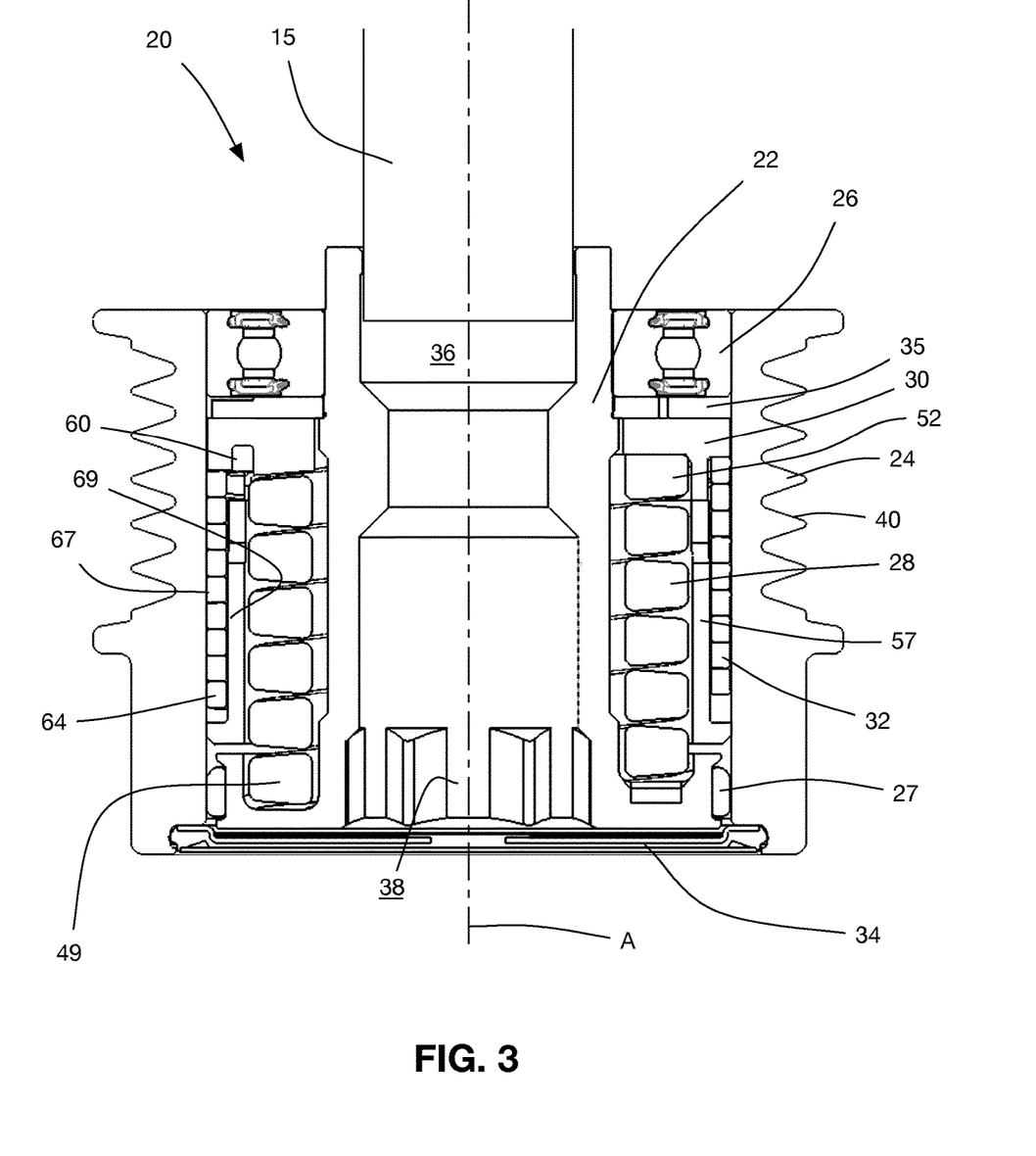
FIG. 3 is a sectional view of the decoupler shown in FIG. 1.

Reference is made to FIG. 2, which shows an exploded view of the decoupler 20, and FIG. 3, which shows a sectional view of the decoupler 20. The decoupler 20 includes a shaft adapter 22, a pulley 24, an isolation spring 28, and a wrap spring clutch 32. In the example shown in FIGS. 2 and 3, the decoupler 20 further includes optional elements including a bearing 26, a bushing 27, a sleeve 29, a carrier 30, an end cap 34 and a thrust plate 35.

The shaft adapter 22 is adapted to mount to the accessory shaft 15 in any suitable way. For example, the shaft adapter 22 may have a shaft-mounting aperture 36 therethrough that defines a rotational axis A for the decoupler 20. The shaft mounting aperture 36 may be configured to snugly receive the end of the accessory shaft 15. The shaft in FIG. 3 is shown only partially inserted into the shaft-mounting aperture 36. A shaft-mounting fastener (not shown) may be inserted through a distal end 38 of the aperture 36 to fixedly mount the shaft adapter 22 to the accessory shaft 15 so that the two co-rotate together about the axis A.

The pulley 24 is rotatably coupled to the shaft adapter 22. The pulley 24 has an outer surface which includes a belt engagement surface 40 that is configured to engage the belt 14 (FIG. 1). The belt 14 may thus be a multiple-V belt.

The pulley 24 further includes an inner surface 43. The bearing 26 and the bushing 27 engage the inner surface 43 of the pulley 24 and rotatably support the pulley 24 on the shaft adapter 22. The bearing 26 may be any suitable type of bearing, such as a sealed ball bearing.

The isolation spring 28 is provided to accommodate oscillations in the speed of the belt 14 relative to the accessory shaft 15. The isolation spring 28 may be a helical torsion spring that has a first end 49 (FIG. 2) that is held in an annular slot 50 and that abuts a radial wall (not shown) in the shaft adapter 22 for torque transfer therewith. The isolation spring 28 has a second end 52 that is positioned in the carrier 30 to transfer torque with an end of the wrap spring clutch, as described further below. The isolation spring 28 further includes a plurality of coils 58 between the first and second ends 49 and 52. An example of a suitable engagement between the isolation spring 28, the shaft adapter 22 and the carrier 30 is shown and described in U.S. Pat. No. 7,712,592, the contents of which are hereby incorporated by reference.

The isolation spring 28 in the embodiment shown, is an opening spring, which means that, as the torque transmitted through the isolation spring 28 increases, the isolation spring 28 opens or expands radially.

The isolation spring 28 may be compressed axially slightly in the decoupler 20 such that it urges the carrier 30 axially into abutment with the thrust plate 35, which is in abutment with the bearing 26, which is itself press-fit between the shaft adapter 22 and the pulley 24.

The wrap spring clutch 32 is a helical member that has a first end 60 (FIG. 4), also referred to as a spring engagement end 60, that is held in the carrier 30 for engagement with the second end 52 of the isolation spring 28, for torque transfer therewith. The wrap spring clutch 32 has a second end 64 that may be referred to as the free end 64 that is, broadly speaking, positioned to transfer torque with the inner surface 43 of the pulley 24, and a plurality of coils 66 between the first and second ends 60 and 64. The wrap spring clutch 32 has a radially outer surface 67, which is an outer surface of the plurality of coils 66, and a radially inner surface 69, which is an inner surface of the plurality of coils 66.

As is known in the art of engine manufacture, the wrap spring clutch 32 permits the pulley 24 to drive the accessory shaft during rotation of the pulley 24 in a drive direction, while permitting the accessory shaft to overrun the pulley 24 in the drive direction (e.g. during shut down of the engine 10).

Thus, a torque path is provided from the pulley 24 through the wrap spring clutch 32, through the isolation spring 29 and into the shaft adapter 22. Worded more broadly, the wrap spring clutch and the isolation spring act in series in a torque path between the pulley 24 and the shaft adapter 22. Worded even more broadly, the pulley 24 may be considered to be just an example of a suitable decoupler input member, and the shaft adapter 22 may be considered to be just an example of a suitable decoupler output member. Thus, it may be said that the wrap spring clutch 32 and the isolation spring 28 act in series in a torque path between the decoupler input member and the decoupler output member.

The isolation spring 28 is radially spaced from the wrap spring clutch 32 by the sleeve 57. The sleeve 57 is, in the embodiment shown, a polymeric member having a hollow cylindrical shape with an axial slot 68 therethrough, so as to permit the sleeve 57 to expand and contract as needed. Alternatively however, the sleeve 57 could have any other suitable shape, such as a shape formed by a helically coiled wire. The sleeve 57 acts as a torque limiter by limiting the amount of room available for radial expansion of the isolation spring 28 (in embodiments wherein the isolation spring 28 is an opening spring). Thus when a torque is provided by the pulley 24 that exceeds a selected limit, the isolation spring 28 expands and engages the sleeve 57. The isolation spring 28 then expands further, causing expansion of the sleeve 57 until the sleeve 57 engages the radially inner 69 of the wrap spring clutch 32, which constrains the sleeve 57 from further expansion. The sleeve 57 then constrains the isolation spring 28 against further radial expansion. The sleeve 57 may be made from any suitable material such as a polymeric material, such as a nylon, for example. An example of a suitable sleeve 57 is shown and described in U.S. Pat. No. 7,766,774, the contents of which are hereby incorporated by reference.

When the decoupler 20 is assembled, one of the radially inner and outer surfaces 67 and 69 of the wrap spring clutch, engages a surface of the pulley 24 in an interference fit. In the embodiment shown, the radially outer surface 67 of the wrap spring clutch engages the inner surface 43 of the pulley in the aforementioned interference fit. The inner surface of the pulley may thus be referred to as a clutch engagement surface. In other embodiments it is possible for the pulley 24 to have a radially outer surface that is the clutch engagement surface and which is engaged by the radially inner surface 69 of the wrap spring clutch 32 in an interference fit.

When a torque is applied from the belt 14 to the pulley 24 to drive the pulley 24 at a speed that is faster than that of the accessory shaft 15, friction between the inner surface 43 of the pulley 24 and the free end 64 of the wrap spring clutch 32 drives the free end 64 through at least some angle in a first rotational direction about the axis A, relative to the first end 60 of the wrap spring clutch 32. The relative movement between the free end 64 driven by the pulley 24 relative to the first end 60 causes the wrap spring clutch to expand radially, which further strengthens the grip between the radially outer surface 67 of the wrap spring clutch 32 and the inner surface 43 of the pulley 24. As a result, the first end 60 of the wrap spring clutch 32 transmits the torque from the pulley 24 to the isolation spring 28, which in turn transmits the torque to the shaft adapter 22. As a result, the shaft adapter 22 is brought up to the speed of the pulley 24. Thus, when the pulley 24 rotates faster than the shaft adapter 22 in the first rotational direction, the wrap spring clutch 32 operatively connects the pulley 24 to the carrier and therefore to the shaft adapter 22.

A volume of lubricant shown at 70 is provided in an interior space 72 in the decoupler 20. The lubricant 70 may be any suitable lubricant such as Krytox™. In a first state of the decoupler, some of the lubricant is positioned between the radially outer surface 67 of the wrap spring clutch 32 and the clutch engagement surface to lubricate the wrap spring clutch and the clutch engagement surface. For example, when the vehicle is turned off, there will be lubricant 70 between the wrap spring clutch 32 and the clutch engagement surface.

At various times during operation of the engine 10 a torque will be applied to the decoupler input member which causes an acceleration of the decoupler input member relative to the decoupler output member. The torque is transmitted through the wrap spring clutch 32 and the isolation spring 28 to the decoupler output member (i.e. the shaft adapter 22 in the present embodiment). However, if the acceleration is beyond a threshold acceleration, the lubricant 70 generates slippage between the wrap spring clutch 32 and the clutch engagement surface for some time. In the embodiment shown, this slippage occurs as a result of the following actions, with reference to FIGS. 5 and 6. As torque is applied to the pulley 24, the torque is transferred to the wrap spring clutch 32 and from the wrap spring clutch 32 into the second end 52 of the isolation spring 28. The torque passes through the isolation spring 28 to the first end 49 thereof, and into the shaft adapter 22. During the torque transfer through the isolation spring 28, the isolation spring 28 expands radially.

It is to be noted that the first end 49 of the isolation spring 28 is positioned axially adjacent the free end 64 of the wrap spring clutch 32. It will be understood that the first end 49 of the isolation spring 28 is not just the helical tip at one end of the isolation spring 28 but is intended to mean just that tip in some embodiments, or the endmost coil 58 of the isolation spring 28 in some embodiments, or the endmost few coils 58 of the isolation spring 28 in some other embodiments. In the embodiment shown, the first end 49 of the isolation spring includes all of the coils that are closer to the helical tip that engages the aforementioned radial wall of the shaft adapter 22, and the second end 52 includes the other coils of the isolation spring 28, which are closer to the opposing helical tip that is positioned in the carrier 30.

As the isolation spring 28 expands, it drives the sleeve 57 to pinch the coils 66 of the wrap spring clutch 32. In particular, the coils 58 of the isolation spring 28 closest to the first end 49 cause pinching of the coils 66 of the wrap spring clutch 32 closest to the free end 64. During torque transfer through the decoupler 20, there is relative movement between the free end 64 and the spring engagement end 60 of the wrap spring clutch 32, and further relative movement between the second end 52 and the first end 49 of the isolation spring 28. From the perspective of the carrier 30, it can be said that there is relative movement of the free end 64 of the wrap spring clutch 32 relative to the carrier 30 in a first rotational direction (shown at D1 in FIG. 4), and there is relative movement of the first end 49 of the isolation spring 28 relative to the carrier 30 in a second rotational direction D2. D1 and D2 are opposite to one another. It can be seen that the greatest amount of relative movement therefore occurs between the first end 49 of the isolation spring 28 and the free end 64 of the wrap spring clutch.

During acceleration of the decoupler input member relative to the decoupler output member that is greater than the threshold acceleration, radial movement of the first end 49 of the isolation spring 28 drives radial movement of the sleeve 57 so as to frictionally engage the free end 64 of the wrap spring clutch 32 so as to cause resistance to rotational movement of the free end 64 of the wrap spring clutch 32 in the first rotational direction D1 relative to the carrier 30.

Figure 4:
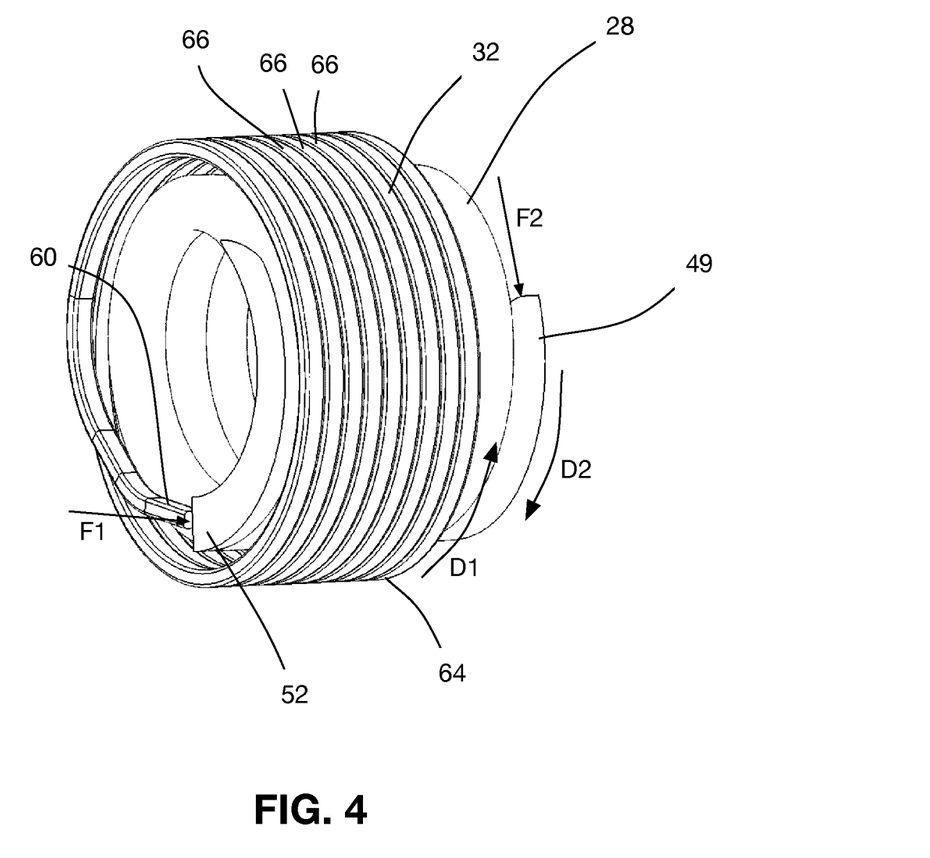
FIG. 4 is a perspective view of some components of the decoupler shown in FIG. 1.
Figure 5:
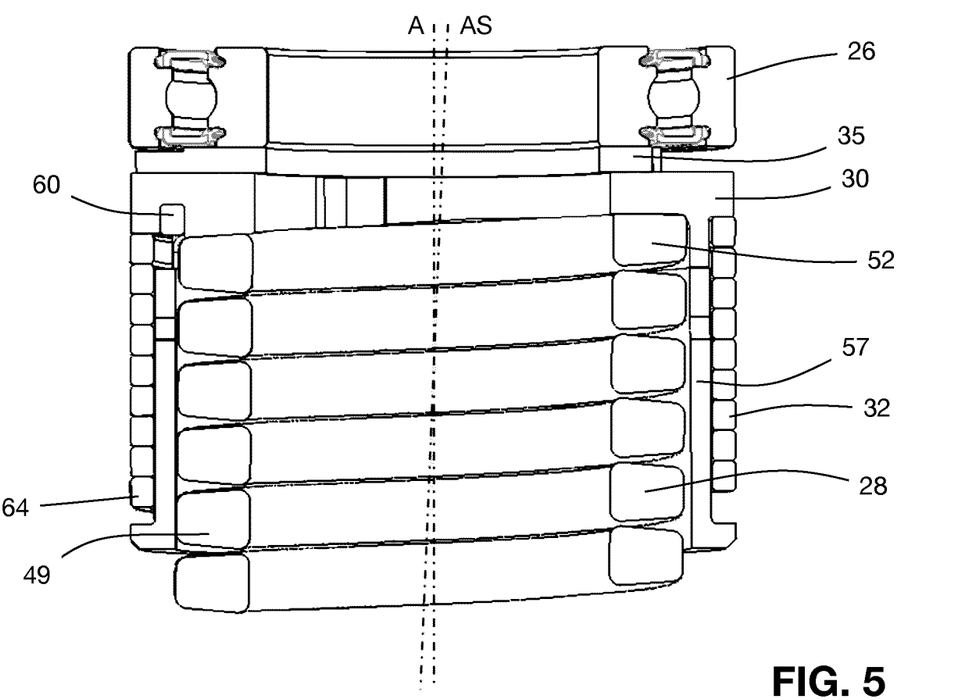
FIG. 5 is a sectional view of the decoupler shown in FIG. 1, during high acceleration of a decoupler input member of the decoupler output member.

Furthermore, the isolation spring 28 thus incurs a first force F1 into it from the spring engagement end 60 of the wrap spring clutch 32 and a second force F2 into it from the radial wall (not shown) of the shaft adapter 22 (which is a reaction force resulting from the torque transfer from the isolation spring 28 into the shaft adapter 22). These first and second forces F1 and F2 are shown in FIG. 4. The positions of the first and second ends 49 and 52 of the isolation spring 28 determine the positions of these first and second forces F1 and F2. In the present embodiment, these forces F1 and F2 combine to cause the isolation spring 28 to be canted slightly. FIG. 5 shows the isolation spring 28 with its axis AS at a slight angle to the axis A of the shaft adapter 22. Optionally, the first and second ends 49 and 52 can be arranged such that the isolation spring 28 is canted in a direction to further pinch the free end 64 of the wrap spring clutch 32, thereby further inhibiting the free end 64 from being dragged by the pulley 24 in an opening direction.

Inhibiting the free end 64 of the wrap spring clutch 32 from moving in the opening direction restricts the radially directed force of engagement that exists between the wrap spring clutch 32 and the pulley 24, which in turn restricts the amount of torque that can be transferred between the wrap spring clutch 32 and the pulley 24.

If the acceleration of the pulley 24 is relatively low, then the force of engagement between the wrap spring clutch 32 and the pulley 24 is sufficient that there is no slippage between the two, and so torque transfer takes place without slip (or essentially without slip).

Figures 7A, 7B:
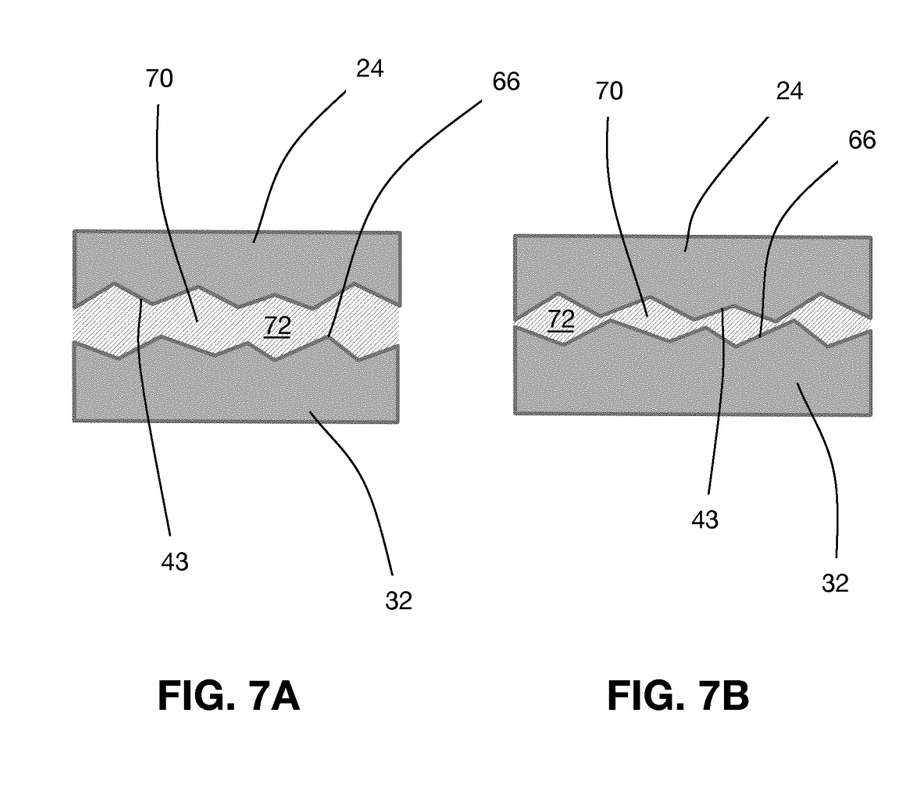
FIGS. 7A, 7B, and 7C are highly magnified views of an interface between a pulley and a wrap spring clutch of the decoupler shown in FIG. 1 during different levels of acceleration of the pulley relative to the wrap spring clutch.
Figure 7C:
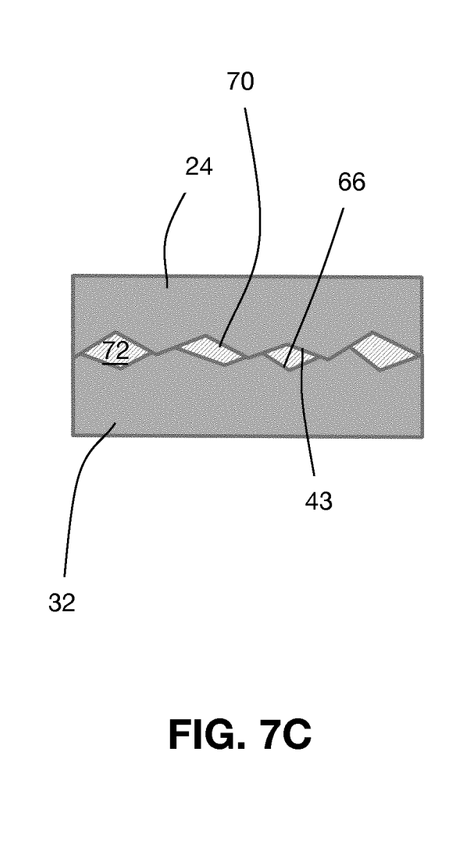

It will be understood that the amount of torque transfer that can take place is dependent on both the radial force of engagement and the coefficient of friction between the wrap spring clutch 32 and the pulley 24. The coefficient of friction is dependent on whether or not there is effectively any lubricant 70 between them, (or more accurately, how much lubricant 70 is between them). FIGS. 7A, 7B and 7C illustrate, at a highly magnified level, what is taking place in this regard. FIG. 7A represents a situation where the decoupler 20 is in the first state, which is when there is no torque applied to the pulley 24 relative to the rest of the decoupler 20 (e.g. when the engine 10 is off). The interface between the wrap spring clutch 32 and the pulley 24 is shown in FIGS. 7A, 7B, and 7C. As can be seen, a relatively large layer of lubricant 70 is present between the wrap spring clutch 32 and the pulley 24.

If the acceleration of the pulley 24 is beyond a threshold acceleration, some torque is transmitted to the wrap spring clutch 32 causing the wrap spring clutch 32 to expand radially into stronger engagement with the pulley 24, however the presence of the lubricant 70 initially provides a low coefficient of friction between the wrap spring clutch 32 and the pulley 24, which permits the movement of the isolation spring 28 and the sleeve 57 to inhibit movement of the free end 64 of the wrap spring clutch, thereby causing slippage between the wrap spring clutch 32 and the pulley 24, and in turn limiting the amount of torque that is transferred through the decoupler 20. This event is represented in FIG. 7B, wherein the wrap spring clutch 32 has expanded by some amount to squeeze out some of the lubricant 70, but wherein there is still enough of a layer of lubricant 70 therebetween, to generate slippage, limiting torque transfer. After a certain period of time, more of the lubricant 70 will be squeezed out of the space between the wrap spring clutch 32 and the pulley 24, such that the radially outer surface 67 of the wrap spring clutch 32 engages the clutch engagement surface without slippage. The amount of time during which there is slippage will depend on such factors as the amount of interference there is between the wrap spring clutch 32 and the pulley 24, and the properties of the lubricant (e.g. the viscosity thereof).

The amount of interference and the lubricant are selected such that, when the decoupler 20 is in the first state and the decoupler input member is accelerated at an acceleration that is beyond the threshold acceleration, the lubricant 70 generates slippage between the wrap spring clutch 32 and the clutch engagement surface for a selected period of time. After the selected period of time, the wrap spring clutch 32 engages the clutch engagement surface without slippage.

The selected period of time is selected such that, when the engine 10 is turned on, the decoupler input member is accelerated at a startup acceleration that is beyond the threshold acceleration, but for a period of time that is less than the selected period of time, such that there is slippage between the wrap spring clutch 32 and the clutch engagement surface throughout when the decoupler input member is accelerated at the startup acceleration.

However, during operation of the vehicle, such as, during cruising at a constant speed and when the decoupler 20 is in the first state (such that there is lubricant in the space between the wrap spring clutch and the pulley 24), when the torque applied to the decoupler 20 is high (such that the acceleration of the decoupler input member is greater than the threshold acceleration) and is sustained for a long period of time, it can occur that the engine 10 can undergo a high torque load for a sustained period of time. In such a situation, accelerating the decoupler input member at an acceleration that is beyond a threshold acceleration for a period of time that is greater than the selected period of time would occur. During this time, the volume of lubricant generates slippage between wrap spring clutch 32 and the pulley 24 for the selected period of time and then, after the first period of time, the wrap spring clutch 32 would engage the pulley 24 without slippage. In other words, during continued acceleration beyond the threshold acceleration after the first period of time, the wrap spring clutch 32 would engage the pulley 24 without slippage.

Figure 8:
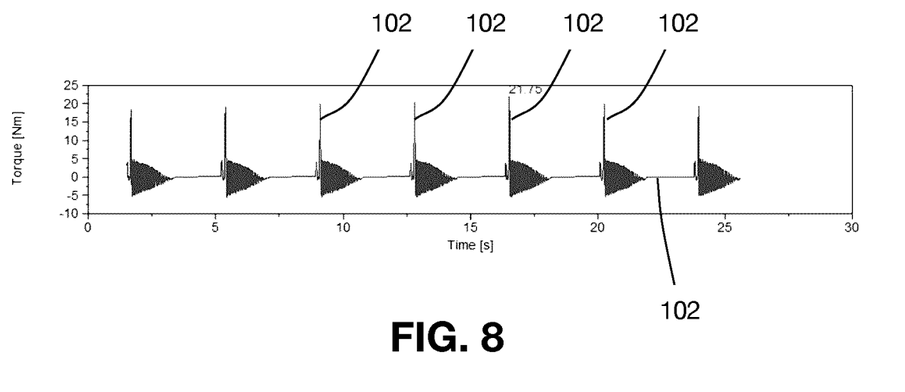
FIG. 8 is a graph illustrating torque output from the decoupler shown in FIG. 1 on a test machine simulating torque spikes providing high acceleration of the pulley.

FIG. 8 is a graph illustrating the output torque (curve 100) from the decoupler 20, during simulated operation of an engine. As a result of the decoupler 20, large torque spikes that are short-lived can be accommodated without transmission of the large torque through the decoupler 20 and into the accessory shaft. Such torque spikes are shown at 102. The spikes in the torque in torque curve 100 are instants where an input torque 60 Nm was transmitted to the decoupler 20 by a belt. As can be seen, the output torque did not exceed 22 Nm. An example of such a situation is during start up of the vehicle in which the engine 10 sits. When the vehicle 10 is off, the decoupler 20 is in the first state (such as is shown in FIG. 7A). When the engine 10 is turned on, the decoupler input member (the pulley 24) is accelerated at a startup acceleration that is beyond the threshold acceleration, but for a period of time that is less than the selected period of time. As a result there is slippage throughout when the decoupler input member is accelerated at the startup acceleration, thereby preventing the decoupler 20 from transmitting all of the associated torque to the alternator shaft. This reduces the amount of stress is incurred by the components of the decoupler 20 itself including the wrap spring clutch 32, the carrier 30, the isolation spring 20 and the shaft adapter 22, as well as the components of the driven accessory.

Figure 9:
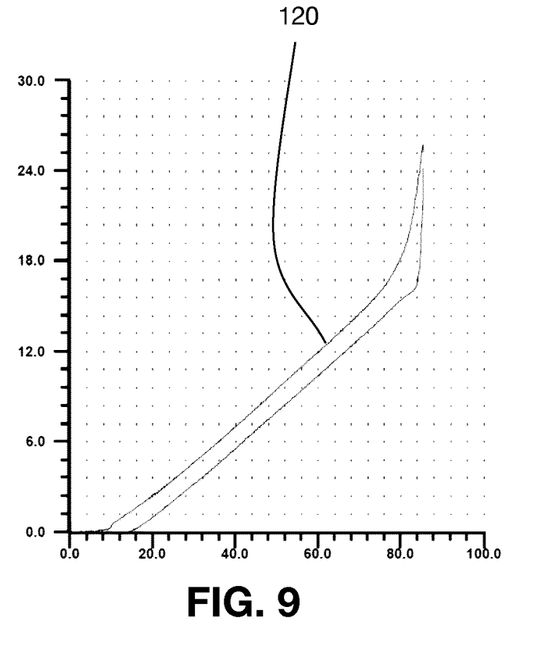
FIG. 9 is a graph illustrating torque output based on angle of the pulley relative to the shaft adapter for the decoupler shown in FIG. 1, for lower torques applied to the decoupler.

FIG. 9 shows the torque-displacement curve 120 for the decoupler 20, when the torque at any instant is less than the threshold acceleration. As can be seen, there is no slippage that occurs—the torque-displacement curve is similar to that of other decoupling devices.

Figure 10:
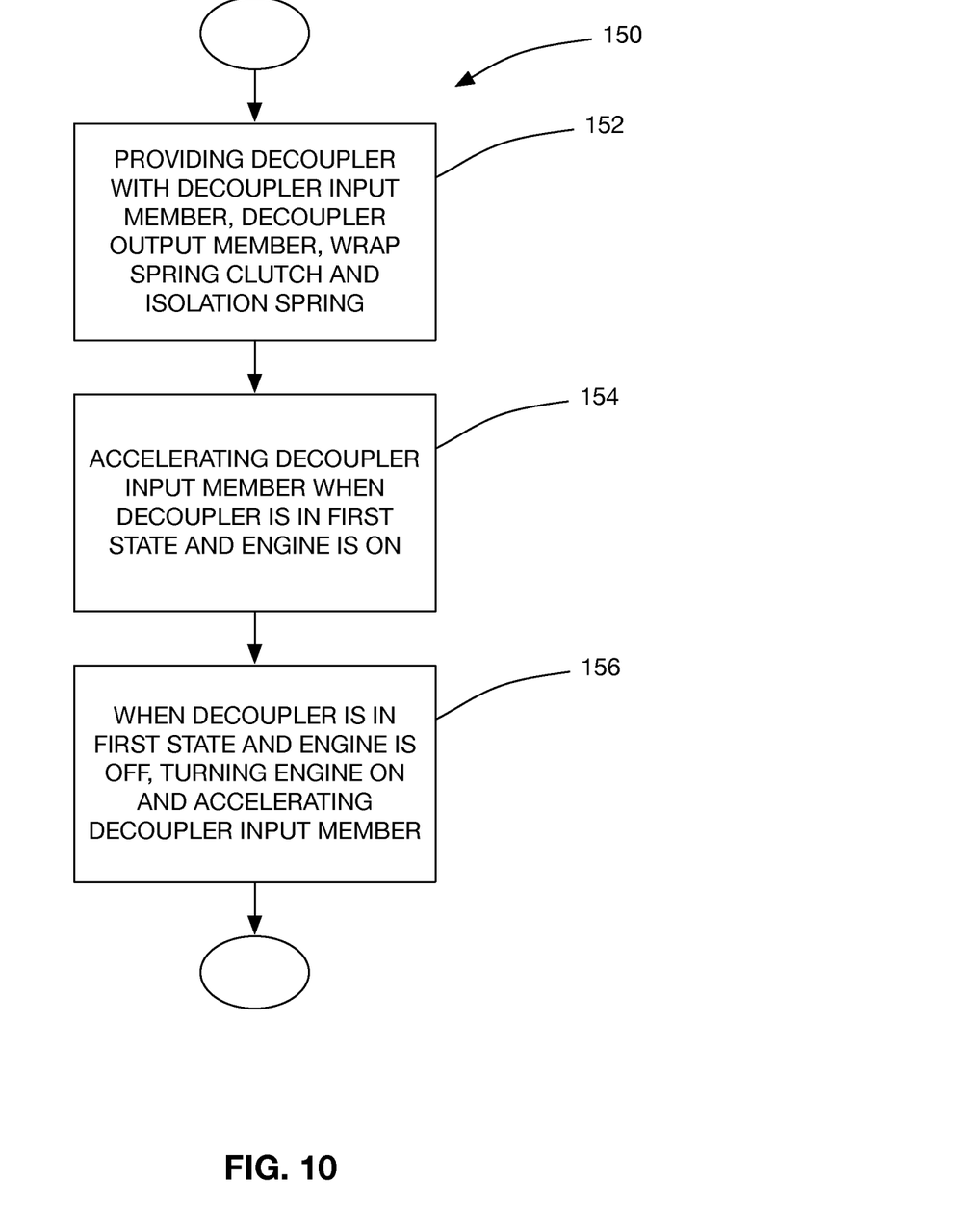
FIG. 10 is a flow diagram illustrating a method of controlling torque to an accessory in an accessory drive on an engine, using a decoupler such as the decoupler shown in FIG. 1.

FIG. 10 illustrates a method 150 of controlling torque to an accessory (e.g. the alternator 16a) in an accessory drive on an engine (e.g. engine 10). The method includes a step 152 of providing a decoupler (such as the decoupler 20) including a decoupler input member (e.g. the pulley 24) and a decoupler output member (e.g. the shaft adapter 22). One of the decoupler input member and the decoupler output member has a clutch engagement surface. The decoupler further includes a wrap spring clutch (e.g. wrap spring clutch 32) and an isolation spring (e.g. isolation spring 28) that act in series in a torque path between the decoupler input member and the decoupler output member. The wrap spring clutch has a radially inner surface and a radially outer surface. One of the radially inner and outer surfaces engages the clutch engagement surface. A volume of lubricant is provided, and, in a first state of the decoupler, is positioned between said one of the radially inner and outer surfaces and the clutch engagement surface to lubricate the wrap spring clutch and the clutch engagement surface.

Step 154 includes, while the decoupler is in the first state and the engine is on, accelerating the decoupler input member at an acceleration that is beyond a threshold acceleration, during which the volume of lubricant generates slippage between said one of the radially inner and outer surfaces and the clutch engagement surface for a period of time that is greater than a selected period of time, wherein, after the first period of time, said one of the radially inner and outer surfaces engages the clutch engagement surface without slippage.

Step 156 includes, while the decoupler is in the first state and the engine is off, turning the engine on and accelerating the decoupler input member at a startup acceleration that is beyond the threshold acceleration, but for a period of time that is less than the selected period of time, such that there is slippage throughout when the decoupler input member is accelerated at the startup acceleration.

Figure 6:
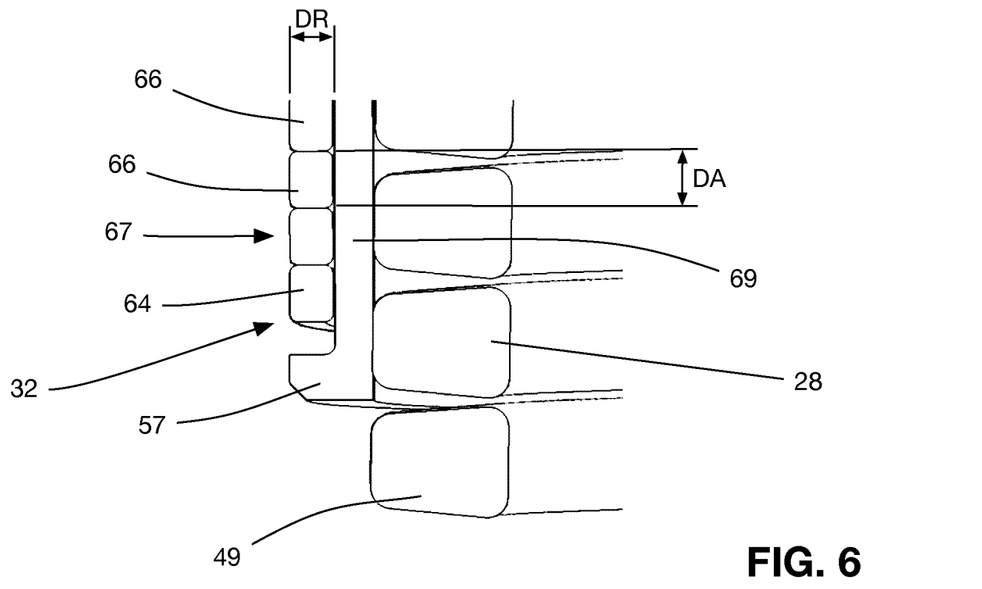
FIG. 6 is a magnified view of a portion of the decoupler shown in FIG. 5.

As can be seen in FIG. 6 particularly, the wrap spring clutch 32 may be formed from a wire that has an axial dimension DA that is greater than a radial dimension DR. As a result of this, there is reduced pressure against the clutch engagement surface, for a given number of coils of wire to form the wrap spring clutch 32, since the overall surface area is larger than, say, for a wrap spring clutch formed by a similar wire but whose radial dimension was less than the axial dimension. Additionally, it will be noted that the reduced radial dimension for the wire of the wrap spring clutch 32 relative to the axial dimension, provides for reduced stiffness in the radial direction, which further contributes to maintaining the slippage when slippage is induced.

While a grease such as Krytox™ has been used in some embodiments for the lubricant 70, it will be noted that the lubricant 70 could be other types of grease. It is theorized that a grease having a relatively low viscosity is preferred.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. A decoupler for an accessory drive for an engine, comprising:
    a decoupler input member and a decoupler output member, wherein one of the decoupler input member and the decoupler output member has a clutch engagement surface;
    a wrap spring clutch and an isolation spring that act in series in a torque path between the decoupler input member and the decoupler output member, wherein the wherein the wrap spring clutch has a radially inner surface and a radially outer surface, wherein one of the radially inner and outer surfaces engages the clutch engagement surface in an interference fit with the clutch engagement surface; and
    a volume of lubricant that, in a first state of the decoupler, is positioned between said one of the radially inner and outer surfaces and the clutch engagement surface to lubricate the wrap spring clutch and the clutch engagement surface,
    wherein, the amount of interference and the lubricant are selected such that, when the decoupler is in the first state and the decoupler input member is accelerated at an acceleration that is beyond a threshold acceleration, the volume of lubricant generates slippage between said one of the radially inner and outer surfaces and the clutch engagement surface for a selected period of time,
    wherein, after the selected period of time, said one of the radially inner and outer surfaces engages the clutch engagement surface without slippage;
    wherein the decoupler is in the first state when the engine is off, and wherein, when the engine is turned on, the decoupler input member is accelerated at a startup acceleration that is beyond the threshold acceleration, but for a period of time that is less than the selected period of time, such that there is slippage throughout when the decoupler input member is accelerated at the startup acceleration.

2. The decoupler as claimed in claim 1, wherein the isolation spring is a helical torsion spring that is radially spaced from the wrap spring clutch by a sleeve, wherein the wrap spring clutch has a spring engagement end that is held in a carrier, and a free end, wherein the free end is positioned to transfer torque with the clutch engagement surface during acceleration of the decoupler input member relative to the decoupler output member, and wherein the isolation spring has a first end and a second end, wherein the second end is positioned in the carrier to transfer torque with the spring engagement end of the wrap spring clutch, and the first end is positioned to transfer torque with the other of the decoupler input member and the decoupler output member, wherein the first end of the isolation spring is positioned axially adjacent the free end of the wrap spring clutch, wherein, during acceleration of the decoupler input member relative to the decoupler output member, there is relative movement of the free end of the wrap spring clutch relative to the carrier in a first rotational direction, and there is relative movement of the second end of the isolation spring relative to the carrier in a second rotational direction, and wherein during acceleration of the decoupler input member relative to the decoupler output member that is greater than the threshold acceleration, radial movement of the first end of the isolation spring drives radial movement of the sleeve so as to frictionally engage the free end of the wrap spring clutch so as to cause resistance to rotational movement of the free end of the wrap spring clutch in the first rotational direction relative to the carrier.

3. The decoupler as claimed in claim 1, wherein said one of the radially inner and outer surfaces is the radially outer surface, and the clutch engagement surface is a radially inner surface of the decoupler input member.

4. The decoupler as claimed in claim 3, wherein the decoupler input member is a pulley and the decoupler output member is a shaft adapter that is configured for mounting to an accessory for the engine.

5. The decoupler as claimed in claim 1, wherein the decoupler input member is a pulley and the decoupler output member is a shaft adapter that is configured for mounting to an alternator for the engine.

6. The decoupler as claimed in claim 1, wherein the wrap spring clutch is made from a wire having cross-sectional shape with a radial dimension and an axial dimension that is greater than the radial dimension.

7. A method of controlling torque to an accessory in an accessory drive on an engine, comprising:
a) providing a decoupler including a decoupler input member and a decoupler output member, wherein one of the decoupler input member and the decoupler output member has a clutch engagement surface, and further including a wrap spring clutch and an isolation spring that act in series in a torque path between the decoupler input member and the decoupler output member, wherein the wrap spring clutch has a radially inner surface and a radially outer surface, wherein one of the radially inner and outer surfaces engages the clutch engagement surface, and further including a volume of lubricant that, in a first state of the decoupler, is positioned between said one of the radially inner and outer surfaces and the clutch engagement surface to lubricate the wrap spring clutch and the clutch engagement surface;
b) while the decoupler is in the first state and the engine is on, accelerating the decoupler input member at an acceleration that is beyond a threshold acceleration, during which the volume of lubricant generates slippage between said one of the radially inner and outer surfaces and the clutch engagement surface for a selected period of time, and then during continued acceleration beyond the threshold acceleration after the first period of time, said one of the radially inner and outer surfaces engages the clutch engagement surface without slippage; and
c) while the decoupler is in the first state and the engine is off, turning the engine on and accelerating the decoupler input member at a startup acceleration that is beyond the threshold acceleration, but for a period of time that is less than the selected period of time, such that there is slippage throughout when the decoupler input member is accelerated at the startup acceleration.

8. The method as claimed in claim 7, wherein the isolation spring is a helical torsion spring that is radially spaced from the wrap spring clutch by a sleeve, wherein the wrap spring clutch has a spring engagement end that is held in a carrier, and a free end, wherein the free end is positioned to transfer torque with the clutch engagement surface during acceleration of the decoupler input member relative to the decoupler output member, and wherein the isolation spring has a first end and a second end, wherein the second end is positioned in the carrier to transfer torque with the spring engagement end of the wrap spring clutch, and the first end is positioned to transfer torque with the other of the decoupler input member and the decoupler output member, wherein the first end of the isolation spring is positioned axially adjacent the free end of the wrap spring clutch, wherein, during acceleration of the decoupler input member relative to the decoupler output member, there is relative movement of the free end of the wrap spring clutch relative to carrier in a first rotational direction, and there is relative movement of the second end of the isolation spring relative to carrier in a second rotational direction, and wherein during acceleration of the decoupler input member relative to the decoupler output member that is greater than the threshold acceleration, radial movement of the first end of the isolation spring drives radial movement of the sleeve so as to frictionally engage the free end of the wrap spring clutch so as to cause resistance to rotational movement of the free end of the wrap spring clutch in the first rotational direction relative to the carrier.

9. The method as claimed in claim 8, wherein said one of the radially inner and outer surfaces is the radially outer surface, and the clutch engagement surface is a radially inner surface of the decoupler input member.

10. The method as claimed in claim 9, wherein the decoupler input member is a pulley and the decoupler output member is a shaft adapter that is configured for mounting to an accessory for the engine.

11. The method as claimed in claim 7, wherein the decoupler input member is a pulley and the decoupler output member is a shaft adapter that is configured for mounting to an alternator for the engine.

* * * * *